United States Patent [19]
Cortes Guasch et al.

[11] Patent Number: 5,482,131
[45] Date of Patent: Jan. 9, 1996

[54] HIGH-PERFORMANCE POWER-ASSISTED STEERING

[75] Inventors: Esteve Cortes Guasch; Juan S. Bacardit, both of Barcelone, Spain

[73] Assignee: Bendix Espana S.A., Barcelona, Spain

[21] Appl. No.: 133,075

[22] PCT Filed: Sep. 13, 1993

[86] PCT No.: PCT/EP93/02475

§ 371 Date: Oct. 12, 1993

§ 102(e) Date: Oct. 12, 1993

[87] PCT Pub. No.: WO94/08836

PCT Pub. Date: Apr. 28, 1994

[30] Foreign Application Priority Data

Oct. 15, 1992 [ES] Spain ................................ 92 02048

[51] Int. Cl.⁶ .................................................. B62D 5/08
[52] U.S. Cl. .................................................. 180/146; 91/380
[58] Field of Search .................................. 180/146, 147, 180/132, 149, 148; 91/375 A, 380; 74/388 PS, 842, 29

[56] References Cited

U.S. PATENT DOCUMENTS 3,180,233 4/1965 Jablonsky .............................. 180/146 X
3,832,933 9/1974 Jablonsky .............................. 180/146 X
4,417,501 11/1983 Elser ..................................... 180/146 X

FOREIGN PATENT DOCUMENTS 1138652 10/1962 Germany .............................. 180/146

*Primary Examiner*—Kevin T. Hurley
*Attorney, Agent, or Firm*—Larry J. Palguta; Leo H. McCormick, Jr.

[57] ABSTRACT

A power-assisted steering device having a piston located in a casing and driven by a rotational input from an input shaft. The piston has a sealing section for separating a first chamber from a second chamber and a transmission section. The transmission section having a U-shaped profile formed by two branches which are coplanar with the main axis of the casing. The branches form racks and mesh at respective geometric sites with toothed sectors which are integral with one another and an output shaft. A sleeve located in the U-shaped profile and connected to the piston prevents relative rotation of the piston and sleeve with respect to the main axis of the input shaft while allowing some relative radial translations with respect to the input shaft as the piston is moved in response to a pressure difference in fluids supplied to the first and second chambers to provide assistance in rotating the output shaft in response to an input applied to the input shaft.

9 Claims, 7 Drawing Sheets

HIGH-PERFORMANCE POWER-ASSISTED STEERING

The present invention relates to a hydraulic assistance device, which can especially be used as power-assisted steering for a motor vehicle, and suitable for converting an input rotational movement into an output rotational movement, this device comprising at least:

- a casing at least one part of which forms a cylinder of revolution about a main axis;
- an input shaft housed in the casing along the direction of this main axis, translationally fixed along this direction, and rotationally driven about this main axis by the input rotational movement;
- an output shaft not coplanar with the input shaft and whose direction is substantially perpendicular to that of the latter;
- a rotary hydraulic directional control valve capable of being actuated by rotation of the input shaft so as to give rise to a pressure difference between first and second chambers, defined in the said cylinder;
- a piston housed in the casing in order to slide axially therein, at least partially under the effect of the said pressure difference, this piston being substantially coaxial with the input shaft, at least partially surrounding the latter, and having, on the one hand, a sealing section separating the two chambers in a sealed fashion and, on the other hand, a transmission section endowed with a rack meshing with a toothed sector rotationally linked to the output shaft, and;
- a movement converter arranged between the input shaft and the piston so as to convert a rotational movement of the first into a translational movement of the second.

A device of this type is well known in the prior art and is described for example in U.S. Pat. No. 4,128,046.

Despite its overall very satisfactory operation, such a device has a relatively high weight and bulk.

Moreover, it requires adjustment of the meshing clearance of the toothed sector with the rack, which increases the complexity of manufacture and the cost thereof.

In this context, the object of the present invention is to provide a device of the aforementioned type having functional performance features which are greater than those of the known device, and especially a reduced size and weight for the same power assistance.

This object is achieved, according to the invention, by virtue of a device essentially characterized in that the transmission section of the piston has, seen in the direction of the said main axis, a profile with two branches in the shape of a U whose branches both form racks and mesh, at respective geometric sites, which are substantially coplanar with one another and with the said main axis, with respective toothed sectors which are integral with one another and with the output shaft.

Thus, in contrast with the device known and described in the aforementioned patent, the device of the invention makes it possible to avoid the reaction of the output torque on the transmission section of the piston causing the appearance on the latter, in addition to an axial force, of a parasitic torque which, due to the eccentric meshing of the toothed sector on the rack, tends to cause the piston to rotate about an axis perpendicular to its translational direction and gives rise to frictional forces which reduce the overall efficiency of the device.

According to another aspect of the invention, the movement converter preferably comprises, on the one hand, an essentially cylindrical sleeve, housed with clearance inside the U-shaped profile formed by the piston, and having, on its internal surface, a helical track for balls, and, on the other hand, means for fixing the sleeve to the piston, suitable for preventing practically any relative rotation of the piston and of the sleeve about the said main axis, and any relative translation other than relative translations along directions perpendicular to the said main axis.

Such an arrangement renders a certain offset of the piston possible, and especially of its transmission section, with respect to the input shaft, and therefore makes it possible to absorb the manufacturing tolerances of the various components without causing the appearance of strains or necessitating adjustments.

For example, the fastening means comprise:

- a radial widening of the sleeve;
- axial stops formed by the piston and arranged facing the radial widening of the sleeve;
- two studs projecting diametrically from the radial widening;
- two non-plane elastic rings together forming two housings inside which the two studs are respectively inserted and can slide along their common direction without freedom of rotation about the said main axis;
- at least one radial extension of each ring, arranged at 90°, for an angular reference frame centered on this ring, with respect to each housing partially formed by this ring; and
- at least two grooves provided in the piston, each radial extension of each ring being intended to be received in one of these grooves and being housed therein so as to slide along its radial direction, and in abutment against it along a direction tangential to this ring.

Moreover, it is advantageous that the input shaft passes, in a sealed fashion, through the sealing section of the piston, and that the axial stops formed by the piston are situated in this sealing section, these characteristics contributing towards increasing, on the one hand, the compactness of the device and, on the other hand, the freedom of movement of the piston, in the region of its transmission section, with respect to the input shaft.

Another substantial advantage may be obtained, with the device of the invention, by endowing it with elastic thrust means bearing on the casing so as to apply, on a contact surface of the transmission section of the piston on the side opposite the racks, an elastic force directed towards the said toothed sectors.

In fact, however much care is given to reducing the clearance between the rack and the toothed sector in the known devices, the total elimination of the clearance is only possible for positions of the piston close to its central position. In contrast, in a device in accordance with the invention and equipped with such elastic thrust means, the clearance between the input and output rotational movements is imperceptible regardless of the position of the piston.

For example, these elastic thrust means comprise at least one roller mounted rotatably about at least a first rotation pin substantially parallel to the direction of the output shaft, this roller rolling over the said contact surface whilst being elastically forced towards it.

In a possible embodiment, the first rotation pin of the roller is linked to a second rotation pin, substantially parallel to the first, eccentric with respect to it, and elastically forced in a direction suitable for bringing the first rotation pin close to the said contact surface.

The second rotation pin may therefore be forced by a spring with annular profile having two ends adopting, along this annular profile, relative angular positions from which they can move away elastically, one first of these two ends being fixed to the casing and the second being rotationally linked to the second rotation pin.

For example, the spring with annular profile is an open ring with a single coil and with elastic opening.

In another possible embodiment, the elastic thrust means comprise at least one roller having a rotation and translation pin substantially parallel to the direction of the output shaft, this roller being elastically forced, by a force directed along this rotation and translation pin, against at least one part of the contact surface which is oriented parallel to the main axis and obliquely with respect to the said rotation and translation pin.

Other characteristics and advantages of the invention will emerge clearly from the description which is given below, by way of example and in no way limiting, with reference to the appended drawings in which.

Figure 5:
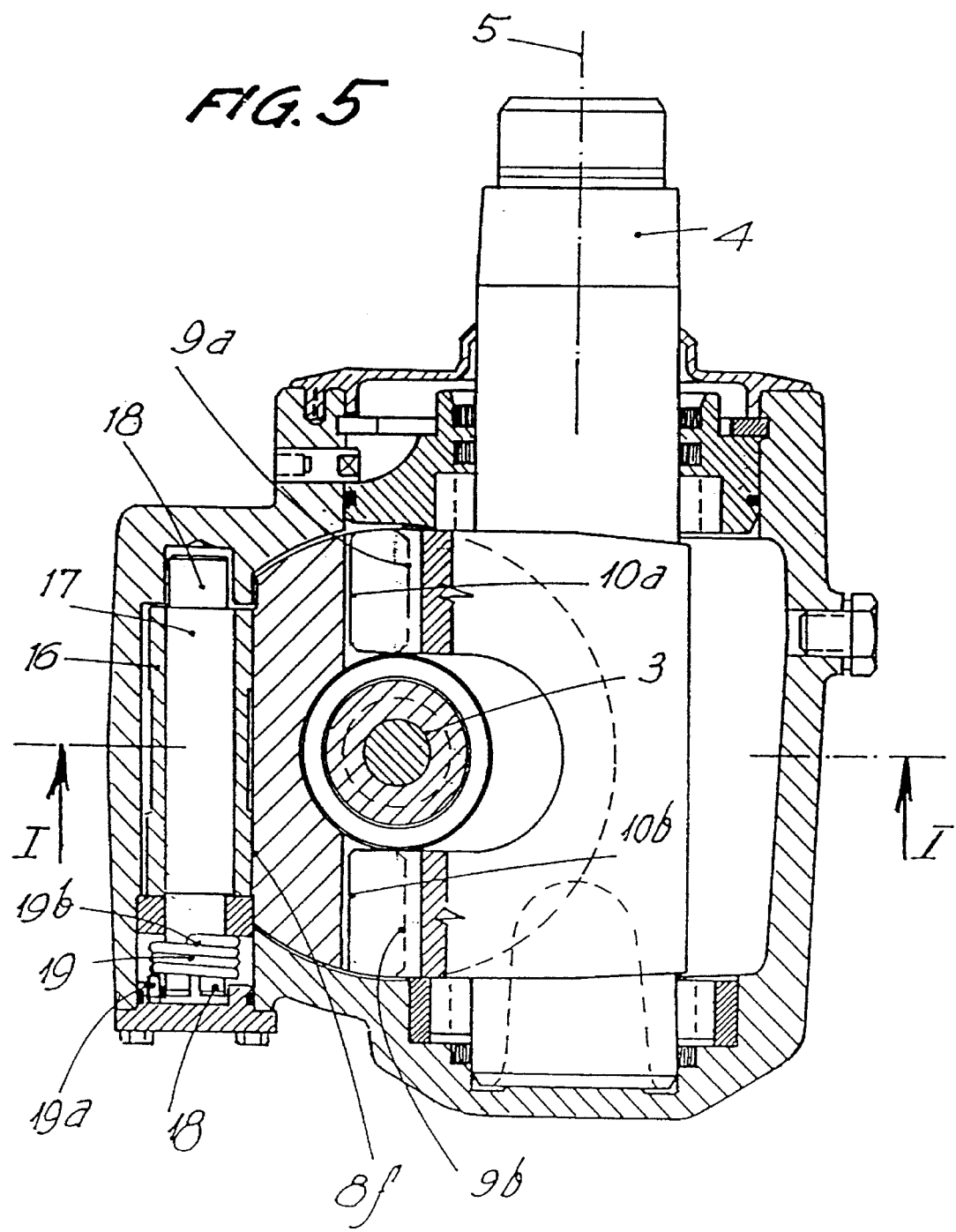
FIG. 5 is a sectional view of the device of the invention along the line V—V of FIG. 1.
Figure 7:
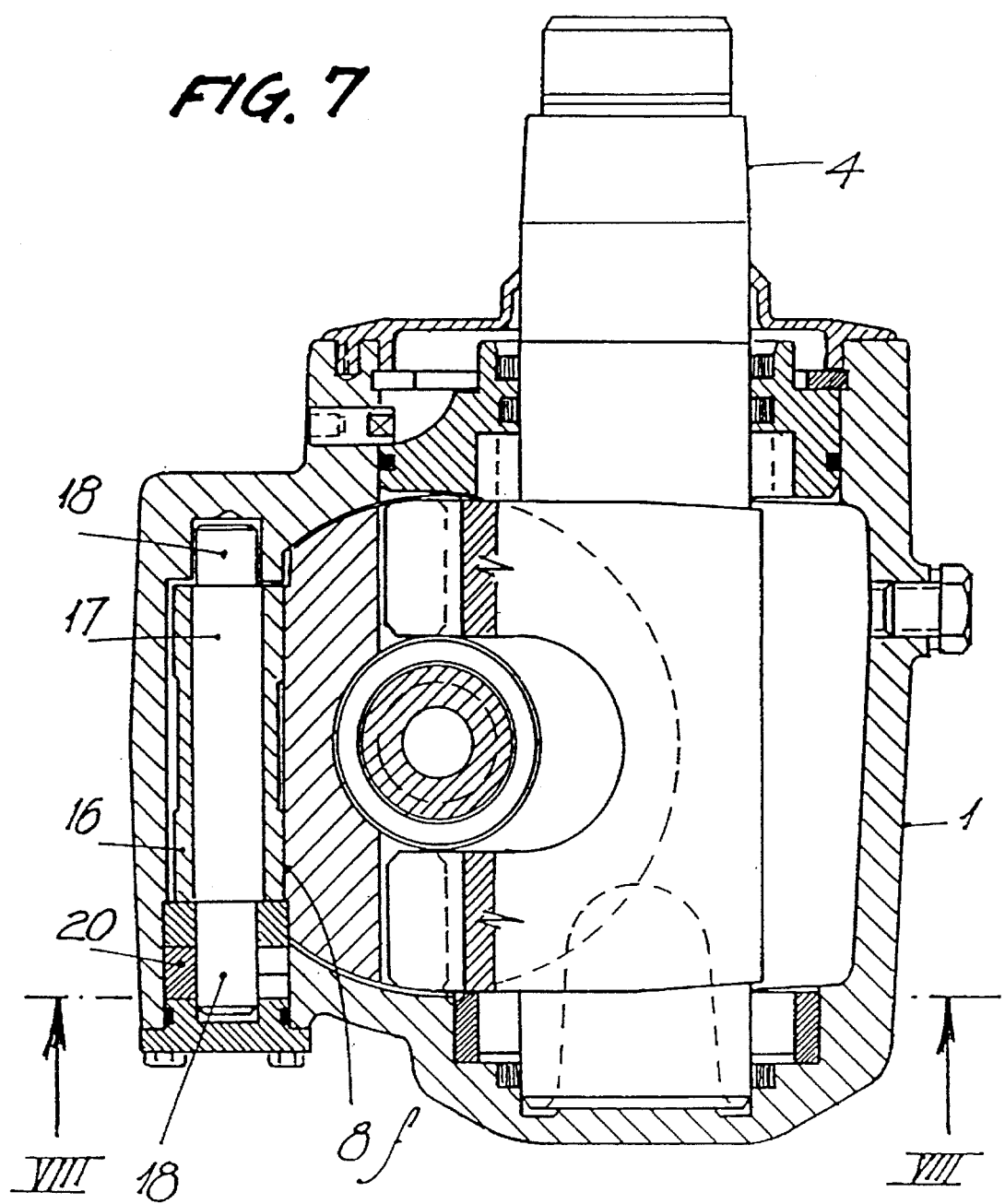
Figure 8:
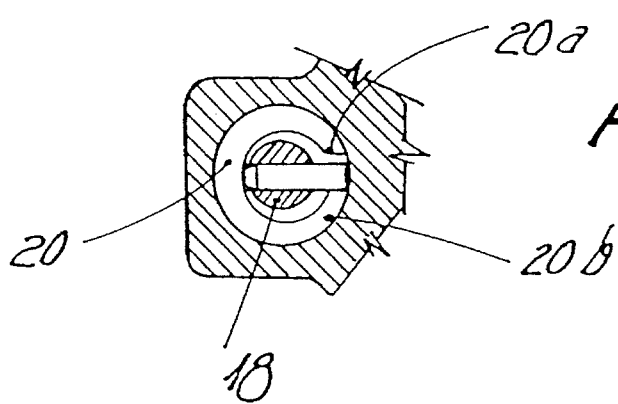
Figure 9:
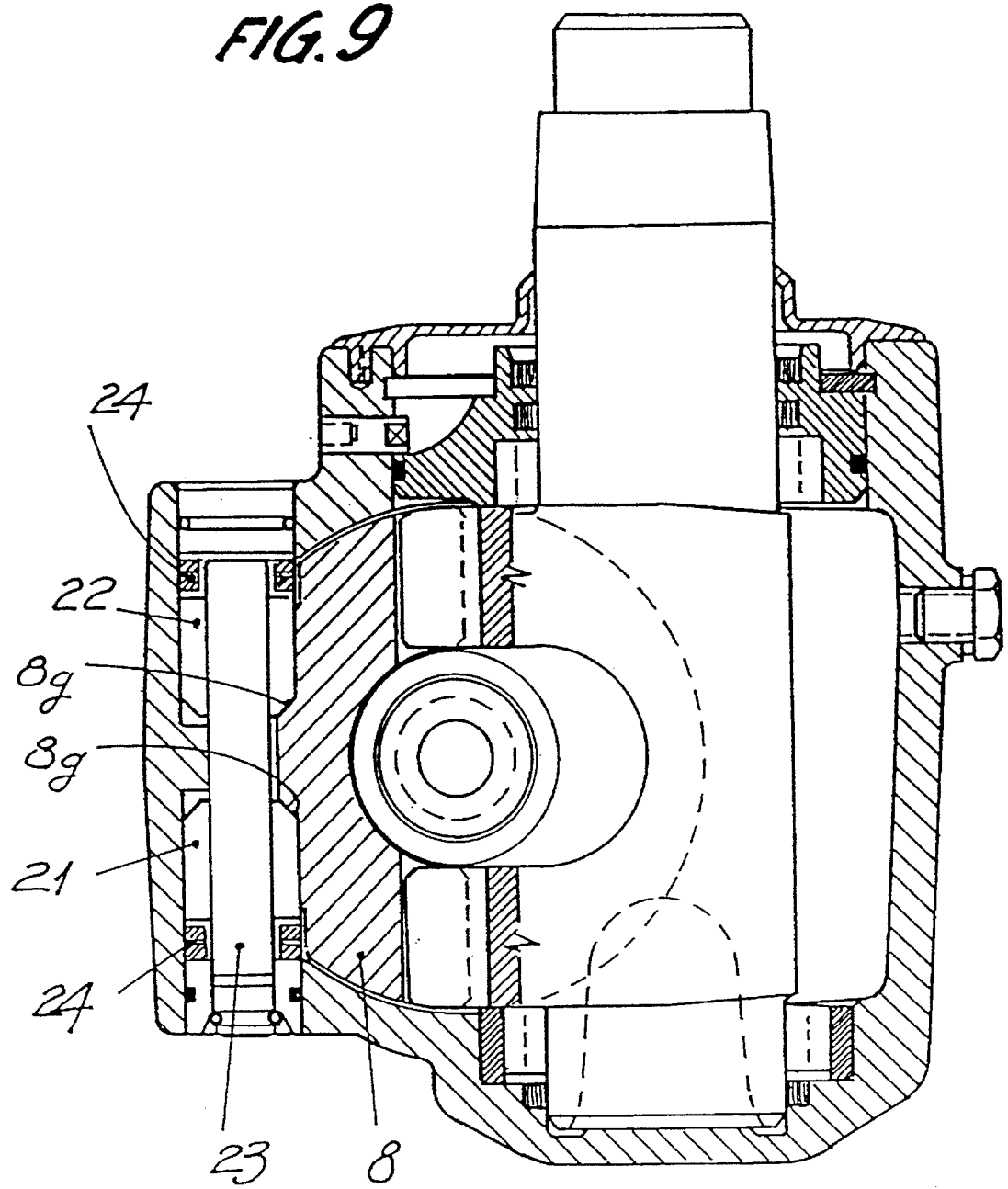

FIG. 7, similar to FIG. 5, illustrates a variant of the elastic thrust means;

FIG. 8 is a detail of a sectional view taken along the line VIII—VIII of FIG. 7;

FIG. 9, similar to FIG. 5, illustrates a variant of the thrust means; and

Figure 1:
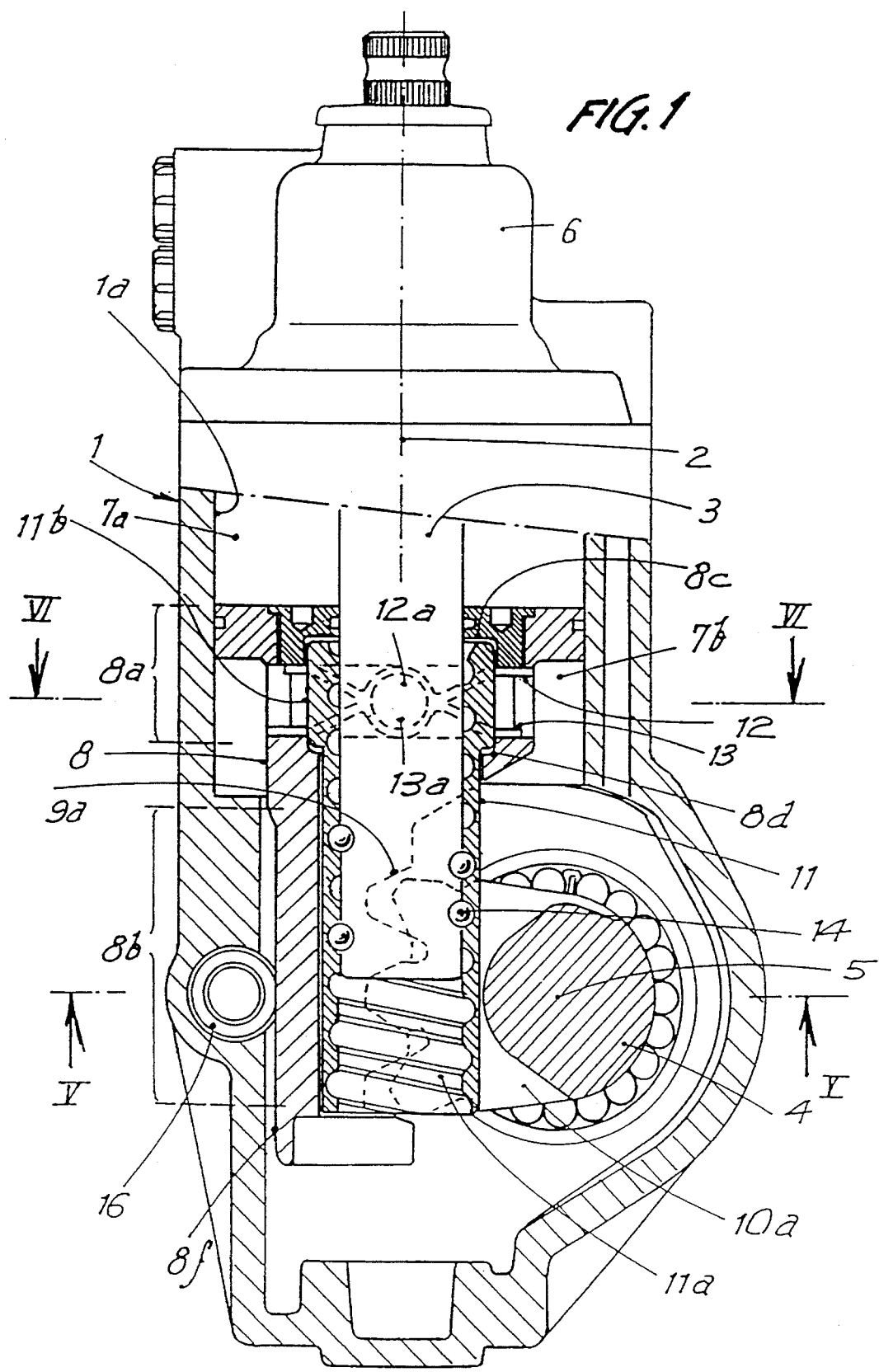
FIG. 1 is a partial sectional view of the device of the invention along the line I—I of FIG. 5.
Figure 10:
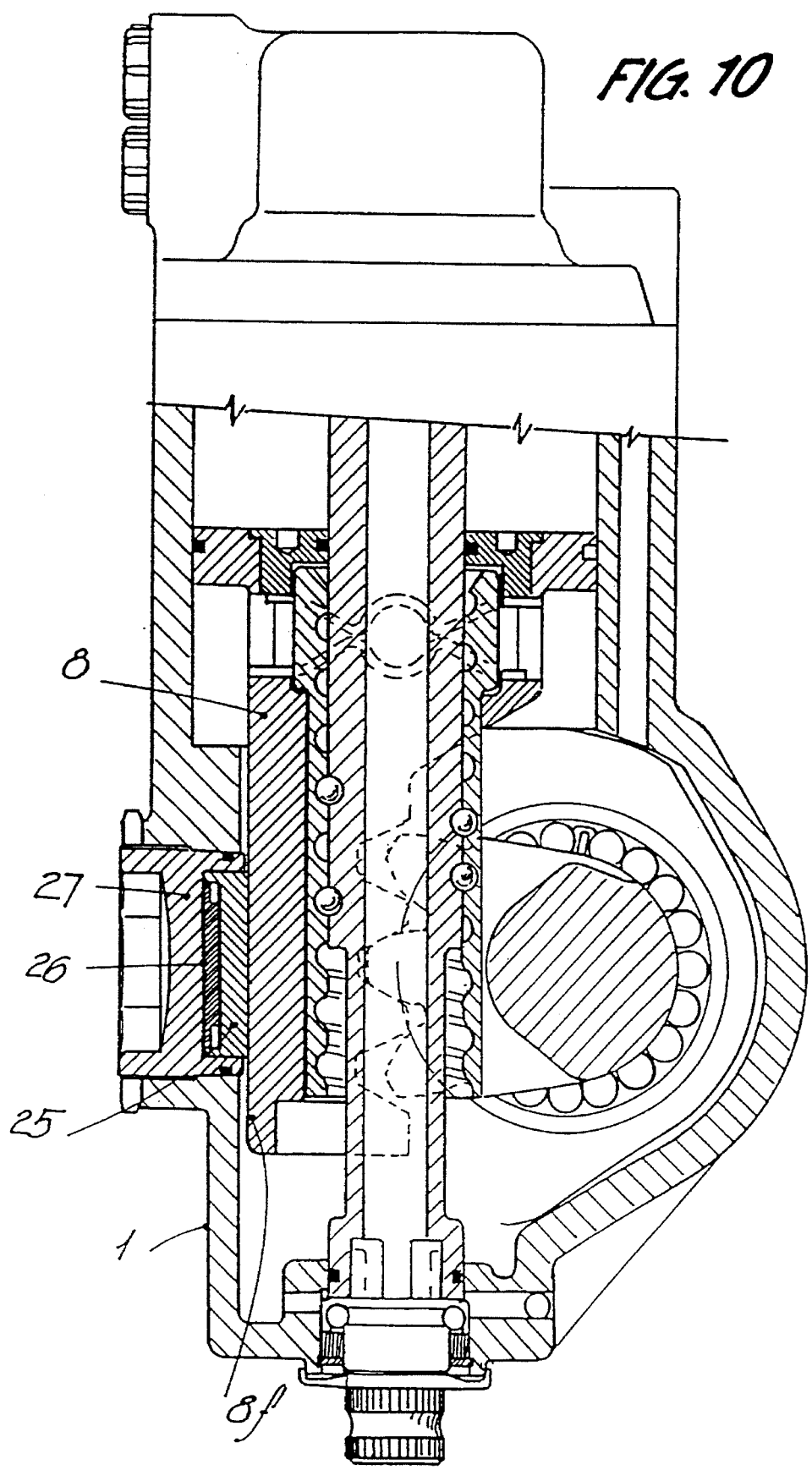

FIG. 10, similar to FIG. 1, illustrates yet another variant of the elastic thrust means.

By convention, two components which, in operation, are integral with one another may, for reasons of clarity and conciseness, be considered in the description which follows as constituting one and the same component, the person skilled in the art being in a position, on the basis of the drawings and of his experience, to recognize, when it appears, the necessity of providing, for manufacture or for mounting, two assembled components instead of one single one.

The device of the invention, in its favoured application, constitutes a power-assisted steering for a motor vehicle, enabling a rotational movement applied to an input shaft, connected to the steering wheel of the vehicle, to be converted into a corresponding rotational movement applied to an output shaft, connected to the steered wheels of this vehicle.

This device firstly comprises a casing 1 whose upper part 1a (in the arrangement illustrated in FIG. 1) forms a cylinder of revolution about a main axis 2.

The input shaft 3, to which the input rotational movement is applied, is housed in the casing 1 along the direction of the main axis 2 and rigidly connected to the casing, by any means of known type, so as to be translationally fixed in the direction of this same axis 2.

The output shaft 4, which undergoes the output rotational movement, is centered on a secondary axis 5 situated in a different plane from that which contains the main axis 2 and adopts a direction substantially perpendicular to that of this main axis 2.

A rotary hydraulic directional control valve 6, of a type known per se, is housed in the head of the casing 1, fed with hydraulic fluid under pressure and actuated by the rotation of the input shaft 3 so as to be able to subject first and second chambers 7a, 7b, defined in the cylindrical part 1a of the casing 1, to respective pressures capable of being different.

These chambers 7a, 7b are separated from one another in a sealed fashion by the sealing section 8a of a piston 8 which is housed in the casing 1 so as to be able to slide therein along the direction of the main axis 2, especially under the effect of the difference in the pressures respectively established in the chambers 7a and 7b.

This piston 8, substantially coaxial with the input shaft 3, at least partially surrounds the latter and has, in the extension of the sealing section 8a, a movement transmission section 8b which, seen in the direction of the main axis 2 (FIG. 5) has a profile with two branches in the shape of a U, partially surrounding the input shaft 3.

Figure 2:
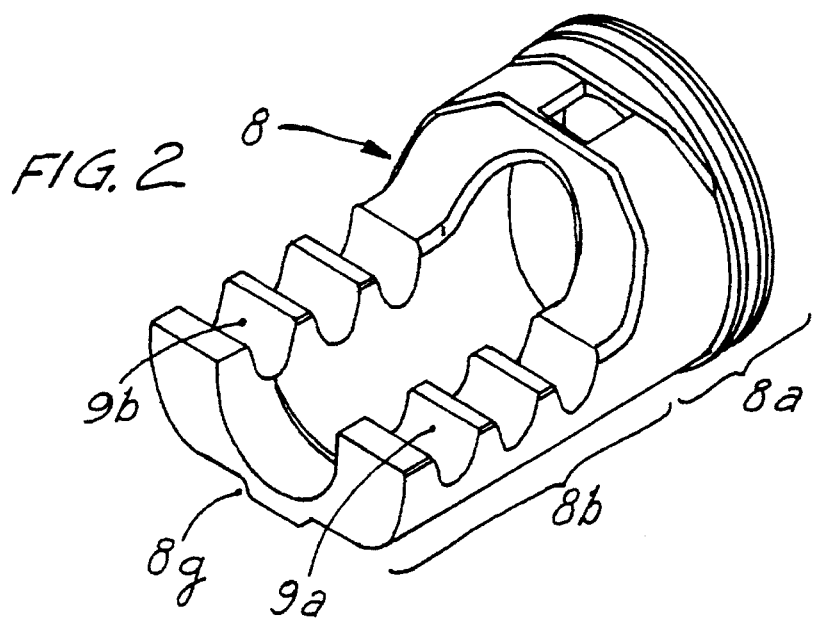
FIG. 2 is a perspective view of the piston.
Figure 3:
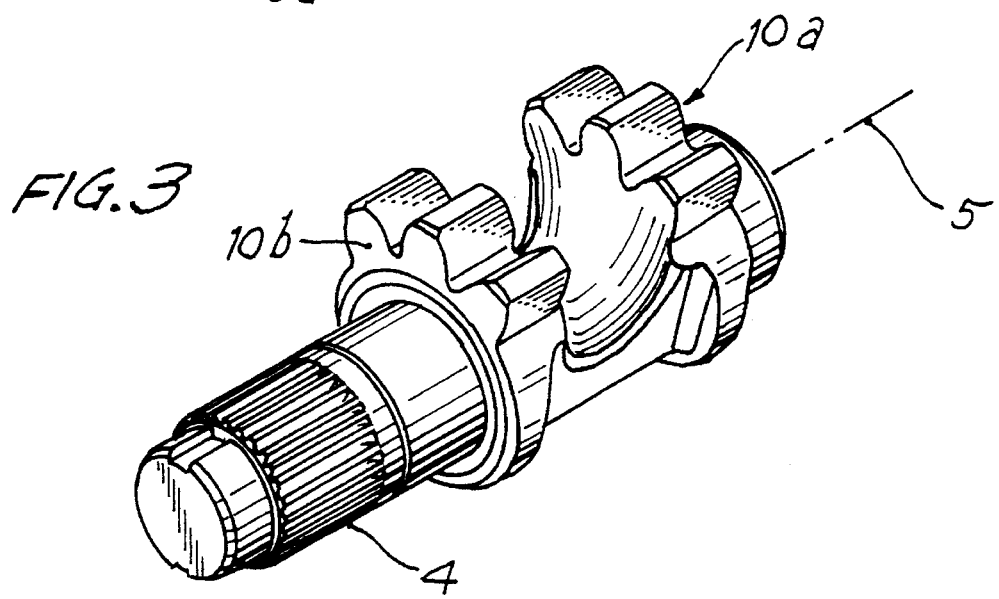
FIG. 3 is a perspective view of the output shaft and of the toothed sectors.

The two branches of this U-shaped profile are shaped into respective racks 9a, 9b (FIG. 2), meshing on either side of the input shaft 3 with respective toothed sectors 10a, 10b centered on the secondary axis 5 and rotationally integral with the output shaft 4 (FIG. 3).

The sites of meshing of the two racks on the two toothed sectors, practically coincident with the main axis 2 in FIG. 1, are substantially coplanar with one another and with this main axis 2.

A movement converter, comprising, inter alia, an essentially cylindrical sleeve 11, is housed between the input shaft 3 and the piston 8 so as to convert a rotational movement of the shaft into a translational movement of the piston 8, and to allow, especially, the output shaft 4 to be rotated even when, due to failure of the hydraulic pressure feed system, the pressure difference between the chambers 7a and 7b is zero.

The sleeve 11 has, on its internal surface, a helical track 11a allowing, with a similar track of opposite pitch provided on the shaft 3, rolling balls 14 to be trapped.

The sleeve 11, whose length is very slightly less than that of the piston 8, is housed with clearance from the inside of the latter and especially on the inside of the U-shaped profile formed by the movement transmision section 8b of this piston.

Fastening means are provided in order to prevent practically any rotation of the sleeve 11 about the main axis 2 with respect to the piston 8, and any relative translation of the sleeve with respect to the piston, except for translations along the two directions perpendicular to one another and to the main axis 2.

Preferably, as shown in FIG. 1, the input shaft passes, in a sealed fashion, through the sealing section 8a of the piston 8, and these fastening means comprise firstly a radial widening 11b of the sleeve and axial stops 8c, 8d provided in the sealing section 8a of the piston 8, facing the radial widening 11b so as to prevent the possibly significant axial forces being exerted between the sleeve 11 and the piston 8 from giving rise to a translation of the first with respect to the second along the direction of the main axis 2 in any direction.

Figure 4:
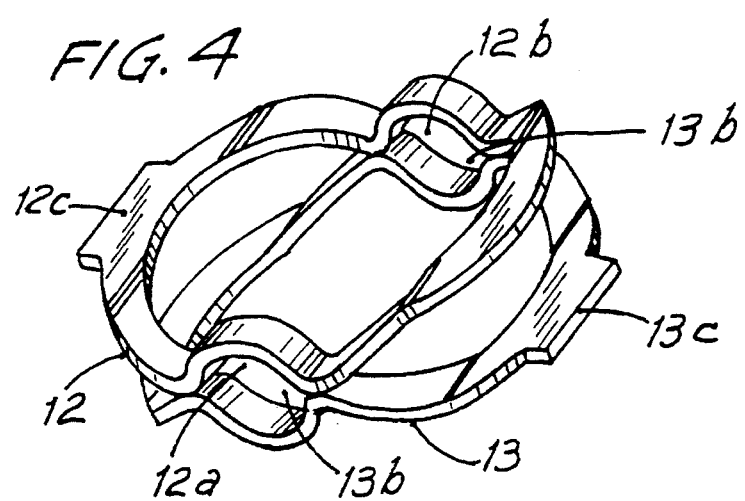
FIG. 4 is a perspective view of the elastic rings.

The means for fastening the sleeve 11 to the piston 8 comprise, moreover, two studs 11c, 11d (FIG. 6) projecting diametrically from the radial widening 11b and each of which is inserted into two half-housings, such as 12a, 13a (FIGS. 1 and 4), procured by two non-plane elastic rings 12 and 13, for example made of steel.

Figure 6:
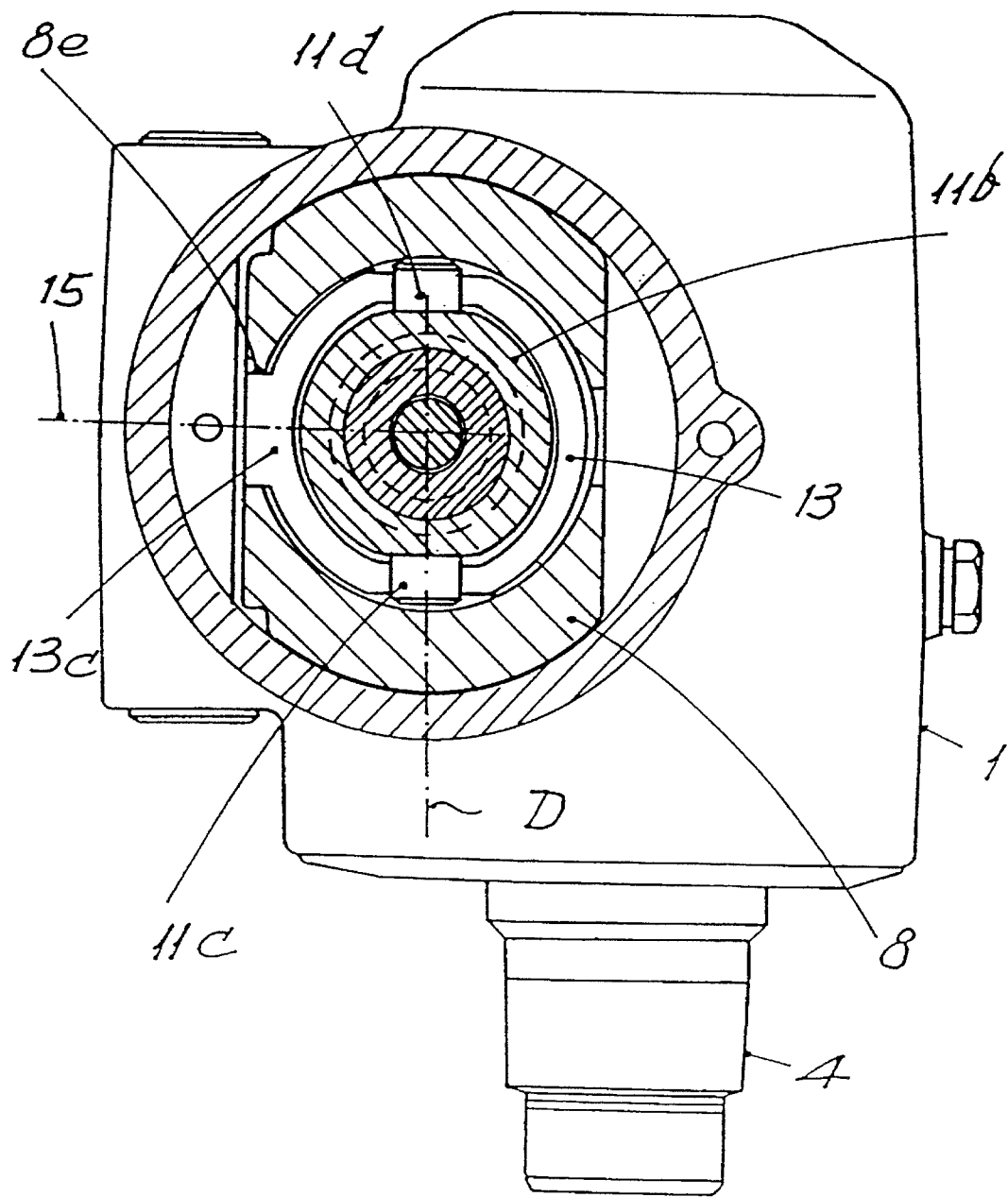
FIG. 6 is a sectional view of the device of the invention along the line VI—VI of FIG. 1.

The size of the housings is chosen, with respect to the size of the studs, so that the only practically possible travel of the studs 11c, 11d with respect to their housings such as 12a, 13a is a sliding of these studs, that is to say a translation, along their common diametric dimension D (FIG. 6).

Moreover, each elastic ring has at least one radial extension such as 12c, 13c arranged at 90°, for an angular reference frame centered on this ring, with respect to the half-housings formed by this ring and accommodating the studs 11c, 11d.

The piston 8 itself has grooves, such as 8e (FIG. 6), each radial extension such as 13c being received in one of these grooves and being housed therein so as to slide along its radial direction such as 15 and in abutment against the edges of the groove along a direction tangential to the ring which carries this radial extension.

The device of the invention moreover comprises elastic thrust means, capable of assuming several possible forms, but which have the common feature of bearing on the casing 1 so as to apply, over a contact surface 8f of the movement transmission section 8b of the piston 8 on the side opposite the racks 9a, 9b, an elastic force directed towards the toothed sectors 10a, 10b.

An elastic force, in the sense of the present description, is a force whose intensity varies little when the surface to which it is applied undergoes a movement of limited amplitude, about a mean position, along the direction of application of this force.

Preferably, the elastic thrust means comprise at least one roller 16 (FIGS. 5 and 7) mounted rotatably about at least a first rotation pin 17 substantially parallel with the axis 5 of the output shaft 4, the roller 16 rolling over the contact surface 8f whilst being elastically forced towards it.

For example, the first rotation pin 17 of the roller 16 is linked to a second rotation pin 18, substantially parallel to the first, eccentric with respect to it, and elastically forced in rotation with respect to the casing 1 in a direction suitable for bringing the first rotation pin 17 and the roller 16 close to the contact surface 8f.

The elastic forcing of the second pin 18 may be obtained by virtue of a spring with annular profile, such as 19 or 20, having two extremities such as 19a, 19b or 20a, 20b adopting, along the length of this profile, relative angular positions from which they can move away elastically, the first of these ends, such as 19a or 20a, being fixed to the casing 1, and the second end, such as 19b or 20b, being rotationally linked to the second pin 18.

This spring may comprise several coils like the spring 19 represented in FIG. 5, or be composed of an open ring with one single coil and with elastic opening, like the spring 20 represented in FIGS. 7 and 8.

The elastic thrust means may adopt yet another embodiment, represented in FIG. 9.

According to the latter, two rollers 21 and 22 are rotatably and translationally mounted on a pin 23 substantially parallel with the axis 5 of the output shaft 4.

Each roller is forced towards the other by an elastic force directed along the pin 23 and exerted by any suitable means, for example by Belleville washers 24.

At least a part 8g of the contact surface of the piston 8 is oriented parallel to the main axis 2 and obliquely with respect to the pin 23, so that each roller 21, 22 is forced against this part 8g of the contact surface and applies an elastic force thereon having a component directed towards the toothed sectors 10a, 10b.

Preferably, the elastic means 24 are chosen in such a fashion that their elastic deformation allows the inclination of the part 8g of the contact surface with respect to the pin 23 and the bearing surface of the rollers on this part, to be given values which, on the one hand, maintain the intensity of the force component directed towards the toothed sectors, and, on the other, which limit the friction produced, in addition to the rolling, between the rollers 21, 22 and the part 8g of the contact surface.

FIG. 10 illustrates yet another embodiment of the elastic thrust means which, although less advantageous overall on the technical plane than the solutions already described, has an economic advantage and may prove sufficient in certain cases.

In this embodiment, the piston 8 is simply thrust in the direction of the toothed sectors by means of a friction pad 25 forced in this direction by a spring 26, assuming for example the form of a Belleville washer, and bearing on a support 27 screwed into the casing 1.

We claim:

1. A hydraulic assistance device for use in a power-assisted steering system for a motor vehicle, said device converting an input rotational movement into an output rotational movement, said device comprising:

a casing at least one part of which forms a cylinder of revolution about a main axis;

an input shaft translationally retained in the casing along the direction of said main axis and rotationally driven about this main axis by said input rotational movement;

an output shaft retained in said casing in a plane substantially perpendicular to said input shaft;

a rotary hydraulic directional control valve actuated by rotation of the input shaft to develop a pressure difference between first and second chambers defined within said cylinder of revolution;

a piston slidably located in said casing in response to said pressure difference between said first and second chambers, said piston being substantially coaxial with and at least partially surrounding said input shaft, said piston having a sealing section for separating said first and second chambers in a sealed fashion and a transmission section, said transmission section having a U shaped profile formed by two branches which are coplanar with said main axis, said branches form racks and mesh at respective geometric sites with toothed sectors which are integral with one another and said output shaft, and;

a movement converter located between said input shaft and said piston to convert a rotational movement of said input shaft into a translational movement of said piston, said movement converter having an essentially cylindrical sleeve retained within a clearance inside said U-shaped profile of said piston, said cylindrical sleeve having a helical track on an internal surface for retaining balls and fastening means for fixing said sleeve to said piston for preventing substantially all relative rotation of said piston and sleeve about said main axis while at the same time only allowing relative radial translation of the sleeve with respect to said main axis.

2. The device according to claim 1, characterized in that said fastening means includes:

a radial widening on said sleeve;

axial stops formed by said piston adjacent said radial widening;

studs projecting diametrically from said radial widening;

first and second non-planar elastic rings which with said casing corresponding first and second housings within said sleeve for receiving said studs, said first and second housings permitting radial movement of said elastic rings with respect to said studs but preventing any rotational movement with respect to said main axis;

at least one radial extension on a peripheral surface of each of said first and second elastic rings; and at least first and second grooves located in said piston for receiving a corresponding radial extension on said first and second elastic rings, said first and second grooves allowing said first and second rings to radially slide.

3. A device according to claim 2, characterized in that said input shaft extends through said sealing section of said piston, and in that said axial stops formed by the piston are located in said sealing section.

4. A device according to claim 1, further comprising elastic thrust means acting on said casing to apply an elastic force directed towards the said toothed sectors through a contact surface of said transmission section of said piston, said contact surface being in a same radial plane but on a side opposite of said racks.

5. A device according to claim 4, characterized in that said elastic thrust means includes at least a first roller mounted on a first pin in a plane substantially parallel to the axis of said output shaft, said roller rolling over said contact surface while being elastically forced towards said contact surface.

6. A device according to claim 5, characterized in that said first pin is linked to a second pin, said second pin being substantially parallel to but eccentric with said first and elastically urged on rotation within said casing in a direction to bring said first pin into engagement with said contact surface.

7. A device according to claim 6, characterized in that said second pin is urged by a spring having an annular profile with first end fixed to said casing and a second end linked to said second pin to permit said second pin to rotate.

8. A device according to claim 7, characterized in that said spring is an open ring with a single coil.

9. A device according to claim 4, characterized in that said elastic thrust means comprise at least one roller having a rotation and translation pin substantially parallel to the axis of said output shaft, said one roller being elastically urged by a force directed through said rotation and translation pin into engagement with said contact surface.

* * * * *